United States Patent

[11] 3,615,801

[72] Inventors Raymond Joseph Marklow;
William Ian Williamson, both of Manchester, England
[21] Appl. No. 862,089
[22] Filed Sept. 29, 1969
[45] Patented Oct. 26, 1971
[73] Assignee Imperial Chemical Industries Limited
London, England
[32] Priority Nov. 6, 1964
[33] Great Britain
[31] 45,288/64
Continuation-in-part of application Ser. No. 506,398, Nov. 4, 1965, now abandoned.

[54] SURFACE COATING COMPOSITIONS
8 Claims, No Drawings
[52] U.S. Cl. .................................................. 106/278,
106/279, 106/280, 106/281, 208/23, 208/44, 260/28
[51] Int. Cl. ........................................................ C08h 13/00,
C08h 17/22, C08i 1/46
[50] Field of Search ........................................... 106/122,
273–285; 94/23; 208/22, 23, 44; 260/28, 28.5, 82, 96.5, 77.5 CR, 77.5 C, 553; 252/496–515

[56] References Cited
UNITED STATES PATENTS

| | | | |
|---|---|---|---|
| 2,625,531 | 1/1953 | Seeger .......................... | 260/77.5 |
| 2,786,864 | 3/1957 | Wirth et al. .................... | 260/77.5 |
| 2,799,663 | 7/1957 | Hampton et al. .............. | 260/77.5 |
| 3,020,249 | 2/1962 | Curtis ............................ | 260/471 |
| 3,084,182 | 4/1963 | McElroy ........................ | 106/273 N X |
| 3,179,610 | 4/1965 | Wood ............................ | 106/273 N X |
| 3,182,032 | 5/1965 | Charlton et al. ............... | 106/273 N X |
| 3,372,083 | 3/1968 | Evans et al. ................... | 260/28 X |
| 3,427,366 | 2/1969 | Verdol et al. ................. | 260/77.5 CR X |

Primary Examiner—Julius Frome
Assistant Examiner—Joan B. Evans
Attorney—Cushman, Darby & Cushman ABSTRACT: Compositions suitable for the preparation of surface coatings which comprise a solution, in a solvent inert to isocyanate groups, of a product containing free isocyanate groups obtained by reacting together a coal tar pitch, optionally at least one other compound containing isocyanate-reactive groups, and an excess of a polyisocyanate composition comprising a mixture of methylene-bridged polyphenyl polyisocyanates containing from about 85 to about 30 percent by weight of methylene bis(phenylisocyanate), the remainder of the mixture being methylene-bridged polyphenyl polyisocyanates having a functionality higher than 2.

SURFACE COATING COMPOSITIONS

This application is a continuation-in-part of copending application Ser. No. 506,398, filed Nov. 4, 1965, now abandoned.

This invention relates to compositions suitable for the preparation of surface coatings and more particularly to compositions containing the reaction product of a coal tar pitch and an excess of certain polyisocyanate compositions.

It is well known that surface coatings may be prepared by allowing solutions of certain polyisocyanates to evaporate in a humid atmosphere, the water from the atmosphere serving to polymerize further and cross-link the polyisocyanate. Coal tar pitches contain groups such as phenolic hydroxyl and amine which are reactive with isocyanate groups, and it has now been discovered that by interaction of these pitches with an excess of certain polyisocyanate compositions, products are obtained which contain free isocyanate groups and which when dissolved in inert solvents afford compositions which give moisture-curing surface coatings.

According to the invention therefore there are provided compositions suitable for the preparation of surface coatings which comprise a solution, in a solvent inert to isocyanate groups, of a product containing free isocyanate groups obtained by heating together at a temperature of from 50° to 200° C. a coal tar pitch containing isocyanate-reactive groups with a stoichiometric excess of a polyisocyanate composition comprising a mixture of methylene-bridged polyaryl polyisocyanates containing from about 85 percent to 30 percent by weight of methylene bis(arylisocyanate), the remainder of the mixture being methylene-bridged polyaryl polyisocyanates having a functionality higher than 2.

The polyisocyanate composition which are used in the preparation of the compositions of the present invention are prepared by phosgenation of the mixture of methylene-bridged polyaryl polyamines obtained by the condensation of primary arylamines with formaldehyde under acidic conditions. Any primary arylamine unsubstituted in the para-position and having at last two positions in the aromatic ring or rings which are reactive towards formaldehyde may be used in the preparation of such polyamine mixtures. Mixtures of such amines may be used. Optionally a minor proportion of primary arylamines having only one position reactive towards formaldehyde may be used in admixture with the above-mentioned primary arylamine.

As examples of primary arylamines which may be used in the preparation of the above-mentioned methylene-bridged polyaryl polyamines there may be mentioned aniline, o-toluidine and o-chloroaniline.

The preferred polyisocyanate composition for use in preparing the compositions of the present invention is that obtained by phosgenation of the mixed polyamines prepared by the condensation of aniline and formaldehyde in the presence of hydrochloric acid, and which comprises a mixture of methylene-bridged polyphenyl polyisocyanates containing from about 85 percent to about 30 percent by weight of methylene bis(phenylisocyanate), the remainder of the mixture being methylene-bridged polyphenyl polyisocyanates having a functionality higher than 2.

The chemical composition of the polyisocyanate compositions depends upon that of the polyamine composition from which they are derived by phosgenation. By varying the molecular ratio of primary arylamine to formaldehyde in the preparation of the polyamine mixtures the amount of methylene bis(arylamine) obtained relative to that of amines of functionality higher than 2 can be varied widely. When the ratio of primary arylamine to formaldehyde is high, then the reaction product will contain a high proportion of methylene bis(arylamine), while as the ratio is reduced the proportion of higher functionality polyamines is increased. In this way polyamine mixtures may be obtained which on phosgenation yield polyisocyanate compositions in which the content of methylene bis(arylisocyanate) may be as high as 85 percent by weight or as low as 30 percent by weight, the remainder being methylene-bridged polyaryl polyisocyanates of functionality higher than 2.

As examples of the coal tar pitch/polyisocyanate reaction product which may be used in the preparation of the compositions of the present invention there may be mentioned any product containing free isocyanate groups which has been obtained by interaction of a polyisocyanate composition as defined above and a coal tar pitch, if desired, in the presence of at least one other compound containing isocyanate-reactive groups; as further examples, there may be mentioned any product containing free isocyanate groups which has been obtained by interaction of a polyisocyanate composition as defined above and coal tar pitch and subsequently modified by reaction with one or more other compounds containing isocyanate-reactive groups. The interaction may be carried out between the components alone or in an inert solvent at any convenient temperature from 50° C. to 200 ° C. and preferably between 75° C. and 120° C., since at lower temperatures the reaction is slow, particles of gelled material are formed and compositions of poor storage stability are obtained, whilst at higher temperatures side reactions may occur. In some cases where other isocyanate-reactive compounds are included there is some incompatibility between these compounds and the pitch which can be overcome by interacting these compounds with the polyisocyanate composition first and then adding the pitch and continuing with the interaction.

Since it is essential to obtain products containing free isocyanate groups a stoichiometric excess of polyisocyanate composition over the total isocyanate-reactive group content present must be used, and it is preferred to employ between 1.2 and 5.0 molar equivalents of polyisocyanate composition per equivalent of isocyanate-reactive group.

The preferred coal tar pitches for use in the preparation of compositions according to the present invention are those which are highly aromatic, with a low β-resin content and virtually free from water and coal tar acids. The pitch sold as Special Pitch No. 3 by United Coke and Chemicals Company Limited is particularly suitable, and has a melting point of 26° C., a viscosity at 15.5° C. of 100,000 poises, a specific gravity at 15.5° C. of 1.227 and a carbon disulfide-insoluble content of 10.3 percent by weight.

As examples of preferred inert solvents there may be mentioned esters such as ethyl acetate, butyl acetate and ethoxy ethyl acetate or ketones such as methyl ethyl ketone, methyl isobutyl ketone, cyclohexanone and 2-methoxy-2-methyl pentan-4-one. Aromatic hydrocarbons such as xylene or toluene can also be used but unless mixed with major proportions of esters or ketones tend to produce uneven coatings The solvent should have a boiling point of at least 75° C. and it is preferred that it should contain a proportion of a solvent of boiling point above 100° C.

The compositions of the invention have excellent stability when stored out of contact with moisture and may be used to coat the chosen substrate by any known method such as brushing, dipping, or spraying. The coatings so obtained are dry after 1 to 2 hours at room temperature in conditions of normal humidity, but if desired higher temperatures, for example up to 120° C. may be used to accelerate the drying rate. coatings of excellent adhesion to substrate including metals, and good resistance to corrosion and chemical attack are obtained.

By including certain other compounds containing isocyanate reactive groups in the reaction between the pitch and the polyisocyanate composition, coating compositions are obtained which give coatings of improved flexibility and impact resistance.

As examples of such of the compounds there may be mentioned hydroxyl-containing polymeric compounds, preferably essentially linear polyesters or polyethers and hydrophobic compounds containing hydroxyl groups, such as castor oil, and monomeric compounds, preferably essentially trifunctional, containing aliphatic or phenolic hydroxyl groups or amino groups.

As suitable polyether resins there may be mentioned, for example, the reaction products of: alkylene oxides, e.g., ethylene, propylene or butylene oxides, styrene oxide and epichlorhydrin, with polyols or amines such as ethylene glycol, propylene glycol, glycerol, trimethylolpropane, pentaerythritol, aniline, tolylene diamine, butylamine, hexamethylene diamine and mono-, di- or triethanolamine, more especially those having molecular weights of from 300 to 5,000. As suitable polyester resins, there may be mentioned the reaction products of polybasic organic acids, e.g. adipic, sebacic, succinic, phthalic, trimellitic or pyromellitic acids, or mixtures thereof with polyols such as ethylene, diethylene, triethylene, propylene and hexylene glycols, glycerol, trimethylolpropane and pentaerythritol or mixtures thereof. The amount of components having a functionally greater than two does not usually exceed 20 percent by weight of the total reactants.

It is preferred to use polyethers and/or polyesters in which the isocyanate-reactive end groups are predominantly hydroxyl, and in which the combined hydroxyl and acid values lie within the range of 30 to 300 mg. KOH/g.

Particularly preferred is an oxypropylated glycerol having a molecular weight of about 1,000.

Coatings obtained from the compositions of the invention prepared using these compounds exhibit good flexibility, excellent adhesion to metal and also to other substrates such as fabrics and fibrous materials; they also have good resistance to corrosion by humidity, salt spray, or aerated sea water, and in accelerated weathermeter tests.

A further improvement, particularly in chemical resistance properties, in the properties of the surface coatings is obtained if the compositions are prepared in the presence also of compounds containing both epoxy groups and isocyanate-reactive groups. Such compounds include for example, the epoxide resins obtained from epichlorhydrin and diphenylolpropane.

Other ingredients, which do not participate essentially in the polymer-forming reaction, may also be present, for example pigments, fillers, flameproofing agents, surface active materials, catalysts, and antioxidants.

The invention is illustrated but not limited by the following examples in which all parts and percentages are by weight unless otherwise stated:

EXAMPLE 1

Pitch containing isocyanate-reactive groups equivalent to approximately 2 percent of hydroxyl groups, a polyisocyanate composition prepared by phosgenating the crude polyamine mixture obtained by condensing formaldehyde and aniline in the presence of hydrochloric acid, and 2-methyl-2-methoxypentan-4-one in the proportions given in table 1 are heated with stirring at a temperature of 80–90° C. for 5½ hours.

The resulting solutions are applied by brush to burnished and degreased mild steel panels and exhibit very good flow and brushing properties. A dry film of thickness about 0.002 inch and good adhesion to metal is obtained in each case.

Table 1

| Pitch | 50 | 50 | 50 | 50 |
|---|---|---|---|---|
| 2-methyl-2-methoxypentan-4-one | 39 | 45 | 51 | 57 |
| Polyisocyanate composition | 9 | 18 | 27 | 36 |
| Appearance of solution | | thixotropic | | |
| Stability of solution | gelled in 1 week | stable for more than 3 months | | |
| Time to tack free state at 20°C. at 65% humidity. | | less than 2 hours. | | |
| Thermoplasticity of coating at 100° C. | slight | slight | none | none |

Example 2

Castor oil, the polyisocyanate composition used in example 1 2-methyl-2-methoxypentan-4-one and a polyester of acid value 2 mg. KOH/g. and hydroxyl value 165 mg. KOH/g. prepared from 1:3 butylene glycol, hexanetriol and adipic acid in the molar ratio 3:1:3 are heated at a temperature between 80° and 90° C. for 8 hours in the proportions given in table 2. Pitch as used in example 1 in the amounts given in table 2 is then added to the reaction mixture and heating continued at a temperature between 80° and 90° C. for a further 3–5 hours. Solutions are obtained which are slightly thixotropic in nature and stable on storage for over 3 months.

The solutions are applied to mild steel panels as described in example 1 and give coatings which are tack free in 2 hours at 20 ° C. and 65 percent humidity and show no thermoplasticity at 100° C. These coatings have improved flexibility, impact resistance properties and adhesion compared with those described in example 1.

Table 2

| Castor oil | – | 10 | – | 10 |
|---|---|---|---|---|
| 2-methyl-2-methoxy pentan-4-one | 68 | 68 | 75 | 75 |
| Polyisocyanate composition | 42 | 42 | 56 | 56 |
| Polyester | 10 | – | 10 | – |
| Pitch | 50 | 50 | 50 | 50 |

Similar products are obtained if in place of the polyester used in the above example, there is used the equivalent amount of one of the following:

a. a polyester of acid value 1 to 3 mg. KOH/g. and hydroxyl value 280 mg. KOH/g. obtained by coesterification of hexanetriol, adipic acid and phthalic anhydride in the molecule ratio of 9.55:5:1.

b. a polyester of acid value 2 to 6 mg. KOH/g. and hydroxyl value 220 mg. KOH/g. obtained by coesterification of glycerol, ethylene glycol and adipic acid in the molecular ratio of 1:3.2:3.

c. a polyester of hydroxyl value about 65 mg. KOH/g. and acid value about 5 mg. KOH/g. obtained by condensing adipic acid, diethylene glycol and pentaerythritol in the molar ratio of 26:28:1.

d. a polyester of hydroxyl value about 55 mg. KOH/g. and acid value about 3 mg. KOH/g. obtained by interaction of adipic acid, diethylene glycol and pentaerythritol in the molar ratio of 49.5:53.5:1.

e. a polyester of hydroxyl value about 230 mg. KOH/g. and acid value about 7 mg. KOH/g. obtained by interaction of adipic acid, 1,3-butylene glycol, pentaerythritol and phthalic anhydride in the molar ratio of 6.1:7:2:1.

f. reaction products of propylene oxide and ethylene glycol of molecular weights 1,000 and 2,000.

g. a reaction products of propylene oxide and trimethylolpropane of molecular weight 310.

h. reaction products of propylene oxide and glycerol of molecular weights 4,000, 3,500, 3,000, 1,500 or 1,000.

i. a reaction product of propylene oxide and ethylene oxide (1:1 molar ratio) with glycerol of molecular weight 3,500.

j. a reaction product of propylene oxide and diaminodiphenylmethane of molecular weight 900.

k. reaction products of propylene oxide and triethanolamine of molecular weights 320 and 380.

l. a reaction product of propylene oxide and a mixture of 2,4- and 2,6-tolylene diamines in the ratio of 4:1 having molecular weight about 460.

Example 3

Pitch containing isocyanate-reactive groups equivalent to 2 percent of hydroxyl groups, the polyisocyanate composition used in example 1, castor oil a polyester prepared from adipic acid ethylene glycol and propylene glycol in the ratio of 2,336:861:453 and having a hydroxyl number of 121 mg. KOH/g. and an acid value of 2.2 mg. KOH/g. and 2-methyl-2- methoxy-pentan-4-one in the proportions given in table 3 are heated with stirring at a temperature of 80–90° C. for 6 hours under dry and inert conditions of reaction. Reaction products so obtained have shown no change in physical properties when stored in a dry atmosphere for more than 9 months.

The solutions are diluted with 2-methyl-2-methoxy-pentan-4-one to 60 percent solids content, and are applied to mold steel panels as described in example 1. The coatings obtained are tack free in 2 hours at 20° C. and 65 percent humidity and show no thermoplasticity at 100° C. All the coatings show excellent adhesion to metal, good flexibility and scratch resistance and give 100 percent values in gloss test D.E.F. 1053 method No. 11 pass one-eighth inch mandrel in Bend Test D..E.F. 1053 and pass 1,600/1,800 grams in scratch resistance test D..E.F. 1053 Method No. 14.

Table 3

| 80% solution of pitch in 2-methyl -2-methoxypentan-4-one | 206 | 187.5 | 206 | 187.5 |
|---|---|---|---|---|
| Castor oil | 32.5 | 120 | – | – |
| Polyisocyanate composition | 178 | 331 | 178 | 178 |
| Polyester | – | – | 32.5 | 120 |
| 2-methyl-2-methoxy pentan-4-one | 83.5 | 162.5 | 83.5 | 162.5 |

EXAMPLE 4

Castor oil, the polyisocyanate composition used in example 1, 2-methyl-2-methoxypentan-4-one, pitch, and epoxide resin obtained from diphenylolpropane and epichlorhydrin are mixed in the proportions given in table 4 and heated with stirring at a temperature between 80° and 90° C. for 3–5 hours. The solution so obtained is used to coat mild steel panels as described in example 1 and gives coatings which are tack free in 2 hours and which exhibit good adhesion to metal and high-impact and chemical resistance.

TABLE 4

| Castor oil | 10 | 10 | 10 | 10 | 10 |
|---|---|---|---|---|---|
| Epoxide resin; epoxy equivalent 175–210 | 8 | 8 | – | – | – |
| Epoxide resin: epoxy equivalent 225–290 | – | – | 8 | – | – |
| Epoxide resin; epoxy equivalent 450–525 | – | – | – | 4 | 4 |
| 2-methyl-2-methoxy pentan-4-one | 76 | 80 | 76 | 76 | 80 |
| Polyisocyanate composition | 43 | 58 | 44 | 44 | 58 |
| Pitch | 50 | 50 | 50 | 50 | 50 |

EXAMPLE 5

Fifty parts of pitch containing isocyanate-reactive groups equivalent to 2 percent of hydroxyl groups, 54 parts of a polyisocyanate composition as described in example 1 and 35 parts of 2-methyl-2-methoxypentan-4-one are heated with stirring at a temperature of 80–90° C. for 5½ hours. The reaction mass is allowed to cool and there is added 38.5 parts of a polyether alcohol (mol. wt. 1,500 and hydroxyl value 36 mg. KOH/g.) and 10 parts of 2-methyl-2-methoxypentan-4-one; the mixture is stirred for 2 hours.

The resulting solution is applied by brushing to burnished and mild steel panels and exhibit very good flow and gloss. The film becomes tack free in less than 2 hours at 20° C. and 65 percent relative humidity. The solution is stable for more than 3 months when stored in a closed container. The cured film displays excellent adhesion to mild steel and is very flexible; it is nonthermoplastic at temperatures up to 100° C.

The polyether alcohol used in the above process may be prepared by the following method.

A mixture of isooctanol (2,000 parts), benzene (250 parts) and potassium hydroxide (69 parts) is azeotroped for 10 hours, then the benzene is distilled off at 150° C. 312 parts of the resultant solution are heated at 100° C. under a nitrogen atmosphere and 3,800 parts of an equimolecular mixture of ethylene and propylene oxides are added during 8½ hours keeping the temperature at, or just below, 110° C. The mixture is stirred at this temperature for 1 hour after the addition is complete and then for a further 30 minutes at a pressure of 15 mm. Adipic acid (6.25 parts) and water (120 parts) are added and then the mixture is stirred at 100° C., for 5 minutes. Fourty-one parts of activated carbon are added and the mixture is heated in vacuo at 80° to 100° C. for 1¼ hours and then filtered hot.

The product has hydroxyl value of 36 mg. KOH/g. and an acid value of 0.5 mg. KOH/g.

EXAMPLE 6

Four hundred forty-two parts of the polyisocyanate composition used in example 1, 456 parts of a 90 percent solution in xylene of Special Pitch No. 3 (United Coke and Chemicals Company Limited) and 104 parts of 2-methyl-2-methoxypentan-4-one are mixed together at room temperature and then heated to 85°–90° C. A solution of 80.5 parts of an oxypropylated glycerol of molecular weight approximately 1,000 in 82 parts of 2-methyl-2-methoxypentan-4-one is then added and the reaction mixture is maintained at a temperature of 85°–90° C. for 4 hours, after which it is cooled and transferred to a sealed moistureproof container. This composition has an isocyanate value of about 8.5 percent and a solids content of about 80 percent. When applied by brush to degreased and blast-cleaned mild steel panels, a film having good adhesion and excellent resistance to solvents and aqueous acids and alkalies is obtained.

We claim:

1. Compositions suitable for the preparation of surface coatings which comprise a solution, in a solvent inert to isocyanate groups, of a product containing free isocyanate groups obtained by heating together at a temperature of from 50° to 200° C. a coal tar pitch containing isocyanate-reactive groups with a polyisocyanate composition in amounts of 1.2–5.0 molar equivalents of polyisocyanate composition per equivalent of isocyanate-reactive group, said polyisocyanate composition comprising a mixture of methylene-bridged polyphenyl polyisocyanates containing from about 85 percent to about 30 percent by weight of methylene bis(phenylisocyanate), said polyisocyanate composition obtained by phosgenation of a mixture of methylene-briged polyphenyl polyamines obtained by condensation of a primary phenylamine with formaldehyde under acidic conditions, said primary phenylamine being selected from the group consisting of aniline, o-toluidine o-chloroaniline and their mixtures.

2. Compositions as claimed in claim 1 wherein the product containing free isocyanate groups has been obtained by heating together at a temperature of from 50° to 200° C. said coal tar pitch with said polyisocyanate composition in the presence of at least one other compound containing isocyanate-reactive groups selected from the group consisting of essentially linear hydroxyl-containing polyesters and polyethers, and castor oil.

3. Compositions as claimed in claim 1 wherein the product containing free isocyanate groups has been obtained by heating together at a temperature of from 50° to 200° C. said coal tar pitch with said polyisocyanate composition, the resultant product then being reacted with at least one other compound containing isocyanate-reactive groups selected from the group consisting of essentially linear hydroxyl-containing polyesters and polyethers, and castor oil.

4. Compositions as claimed in claim 1 wherein the product containing free isocyanate groups has been obtained by heating together at a temperature of from 50° to 200° C., said coal tar pitch with said polyisocyanate composition an epoxide resin obtained from epichlorhydrin and diphenylolpropane.

5. Compositions as claimed in claim 1 wherein said polyisocyanate composition is obtained by phosgenation of a mixture of methylene-bridged polyphenyl polyamines obtained by condensation of aniline with formaldehyde in the presence of hydrochloric acid.

6. Compositions as claimed in claim 1 wherein said inert solvent has a boiling point of at least 75° C.

7. Compositions as claimed in claim 6 wherein said inert solvent is selected from the group consisting of ethyl acetate, butyl acetate, ethoxyethyl acetate, methyl ethyl ketone, methyl isobutyl ketone, cyclohexanone and 2-methoxy-2-methyl pentan-4-one.

8. Compositions as claimed in claim 6 wherein said inert solvent comprises a mixture of a minor proportion of a member selected from the group consisting of xylene and toluene with a major proportion of a member selected from the group consisting of ethyl acetate, butyl acetate, ethoxyethyl acetate, methyl ethyl ketone, methyl isobutyl ketone, cyclohexanone and 2-methoxy-2-methyl pentan-4-one.

* * * * *